US011837716B2

(12) United States Patent
Song et al.

(10) Patent No.: US 11,837,716 B2
(45) Date of Patent: Dec. 5, 2023

(54) ELECTRODE ASSEMBLY FOR RECHARGEABLE LITHIUM BATTERY, AND RECHARGEABLE LITHIUM BATTERY INCLUDING SAME

(71) Applicant: Samsung SDI Co., Ltd., Yongin-si (KR)

(72) Inventors: Hyo-Jung Song, Yongin-si (KR); Jinhyon Lee, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 132 days.

(21) Appl. No.: 17/445,990

(22) Filed: Aug. 26, 2021

(65) Prior Publication Data

US 2022/0069293 A1 Mar. 3, 2022

(30) Foreign Application Priority Data

Aug. 28, 2020 (KR) .................. 10-2020-0109587

(51) Int. Cl.
*H01M 4/36* (2006.01)
*H01M 10/0525* (2010.01)
(Continued)

(52) U.S. Cl.
CPC ........... *H01M 4/364* (2013.01); *H01M 4/133* (2013.01); *H01M 4/134* (2013.01); *H01M 4/137* (2013.01);
(Continued)

(58) Field of Classification Search
CPC ............. H01M 10/0525; H01M 10/44; H01M 2004/021; H01M 2004/027; H01M 4/133;
(Continued)

(56) References Cited

U.S. PATENT DOCUMENTS

2013/0260217 A1\* 10/2013 Matsui .................... B60L 50/64
429/211
2019/0355952 A1 11/2019 Yoon et al.
(Continued)

FOREIGN PATENT DOCUMENTS

JP 2014-137879 A 7/2014
JP 2018-156844 A 10/2018
(Continued)

*Primary Examiner* — Victoria H Lynch
(74) *Attorney, Agent, or Firm* — Lewis Roca Rothgerber Christie LLP

(57) ABSTRACT

An electrode assembly for a rechargeable lithium battery and a rechargeable lithium battery including the same are disclosed. The electrode assembly for the rechargeable lithium battery includes: a negative electrode including a current collector; a negative active material layer; an organic-inorganic composite layer integrated with the negative active material layer, the negative active material layer including an organic layer and an inorganic layer; and a positive electrode, the negative active material layer including a first layer physically contacting the current collector, the first layer including a first carbon-based negative active material, and a second layer on the first layer, including a second carbon-based negative active material, wherein a DD value of the first layer is about 30% to about 90% of a DD value of the negative active material layer, and the DD values are defined by Equation 1.

$DD$(Degree of Divergence)=$(I_a/I_{total})$*100      Equation 1

14 Claims, 5 Drawing Sheets

(51) Int. Cl.
*H01M 4/133* (2010.01)
*H01M 4/134* (2010.01)
*H01M 10/44* (2006.01)
*H01M 4/137* (2010.01)
*H01M 4/60* (2006.01)
*H01M 4/587* (2010.01)
*H01M 4/02* (2006.01)

(52) U.S. Cl.
CPC ........... *H01M 4/366* (2013.01); *H01M 4/587* (2013.01); *H01M 4/604* (2013.01); *H01M 4/608* (2013.01); *H01M 10/0525* (2013.01); *H01M 10/44* (2013.01); *H01M 2004/021* (2013.01); *H01M 2004/027* (2013.01)

(58) Field of Classification Search
CPC ...... H01M 4/134; H01M 4/137; H01M 4/364; H01M 4/366; H01M 4/587; H01M 4/604; H01M 4/608; H01M 50/446; Y02E 60/10; Y02P 70/50
See application file for complete search history.

(56) References Cited

U.S. PATENT DOCUMENTS

2020/0388832 A1  12/2020  Kwon et al.
2021/0057702 A1   2/2021  Seok et al.

FOREIGN PATENT DOCUMENTS

| KR | 10-2010-0072532 A | 7/2010 |
| KR | 10-1841792 B1 | 3/2018 |
| KR | 10-2018-0062390 A | 6/2018 |
| KR | 10-2018-0097036 A | 8/2018 |
| KR | 10-2019-0108792 A | 9/2019 |
| KR | 10-2020-0124513 A | 11/2020 |
| KR | 10-2020-0124514 A | 11/2020 |

* cited by examiner

ELECTRODE ASSEMBLY FOR RECHARGEABLE LITHIUM BATTERY, AND RECHARGEABLE LITHIUM BATTERY INCLUDING SAME

CROSS-REFERENCE TO RELATED APPLICATION

This application claims priority to and the benefit of Korean Patent Application No. 10-2020-0109587 filed in the Korean Intellectual Property Office on Aug. 28, 2020, the entire contents of which are incorporated herein by reference.

BACKGROUND

1. Field

Embodiments of the present disclosure relate to an electrode assembly for a rechargeable lithium battery and a rechargeable lithium battery including the same.

2. Description of the Related Art

Rechargeable lithium batteries have recently drawn attention as a power source for small portable electronic devices. Rechargeable lithium batteries use an organic electrolyte solution and thereby have a discharge voltage that is two or more times higher than that of an existing battery that utilizes an alkali aqueous solution and accordingly, have high energy density.

As for a positive active material of a rechargeable lithium battery, oxides including lithium and a transition metal with a structure capable of intercalating/deintercalating lithium ions, such as $LiCoO_2$, $LiMn_2O_4$, $LiNi_{1-x}Co_xO_2$ (0<x <1), and the like have been mainly used.

As for negative active materials, various carbon-based materials capable of intercalating/deintercalating lithium ions such as artificial graphite, natural graphite, hard carbon, and the like have been used. Recently, a non-carbon-based negative active material such as silicon or tin has been researched in order to obtain high capacity.

The above information disclosed in this Background section is only for enhancement of understanding of the background of the present disclosure, and therefore it may contain information that does not form the prior art that is already known in this country to a person of ordinary skill in the art.

SUMMARY

An embodiment of the present disclosure provides an electrode assembly for a rechargeable lithium battery that exhibits reduced electrical resistance and is economical.

Another embodiment provides a rechargeable lithium battery including the same.

An embodiment provides an electrode assembly for a rechargeable lithium battery including: a negative electrode including a current collector, a negative active material layer positioned on the current collector, and an organic-inorganic composite layer integrated with the negative active material layer, and the organic-inorganic composite layer includes an organic layer and an inorganic layer; and a positive electrode, wherein the negative active material includes a first layer including a first carbon-based negative active material that physically contacts the current collector, and a second layer including a second carbon-based material, on the first layer, wherein a DD (Degree of Divergence) value of the first layer is about 30% to about 90% of a DD value of the negative active material, and the DD values are defined by Equation 1.

$$DD(\text{Degree of Divergence})=(I_a/I_{total})*100 \quad \text{Equation 1}$$

In Equation 1, $I_a$ is a sum of peak intensities at non-planar angles measured by X-ray diffraction (XRD) using a CuKα ray, and $I_{total}$ is a sum of peak intensities at all angles measured by an XRD using a CuKα ray.

The organic layer may physically contact the negative active material layer. In one or more embodiments, the inorganic layer may physically contact the negative active material layer.

The organic layer may be a polyolefin-based polymer, polyester, polyamide, polyimide, polyamideimide, polyetherimide, polyacrylonitrile, polyvinylidene fluoride, polyvinylchloride, polyvinylidene chloride, a polyethylene glycol derivative, polyoxide, polyvinylacetate, polystyrene, polyvinylpyrrolidone, a copolymer thereof, or a combination thereof.

The inorganic layer may include an inorganic material selected from alumina ($Al_2O_3$), boehmite (aluminum oxide hydroxide), zirconia, titanium oxide ($TiO_2$), silica ($SiO_2$), and a combination thereof.

The DD value of the first layer may be about 70% to about 90% of the DD value of the negative active material layer.

The organic layer may have a thickness of about 1 μm to about 20 μm.

The inorganic layer may have a thickness of about 1 μm to about 25 μm.

The DD value of the negative active material layer may be about 19 to about 60, and the DD value of the first layer may be about 18 to about 54.

The $I_a$ is a sum of peak intensities at 2θ=42.4±0.2°, 43.4±0.2°, 44.6±0.2°, and 77.5±0.2° measured by XRD using a CuKα ray, and the $I_{total}$ is a sum of peak intensities at 2θ=26.5±0.2°, 42.4±0.2°, 43.4±0.2°, 44.6±0.2°, 54.7±0.2°, and 77.5±0.2° measured by XRD using a CuKα ray.

The peak intensity may be a peak integral area value.

The first carbon-based negative active material and/or the second carbon-based negative active material may be artificial graphite or a mixture of artificial graphite and natural graphite.

Another embodiment provides a rechargeable lithium battery including the electrode assembly and an electrolyte.

Other embodiments are included in the following detailed description.

An electrode assembly for a rechargeable lithium battery according to one embodiment exhibits low battery resistance and is economical.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
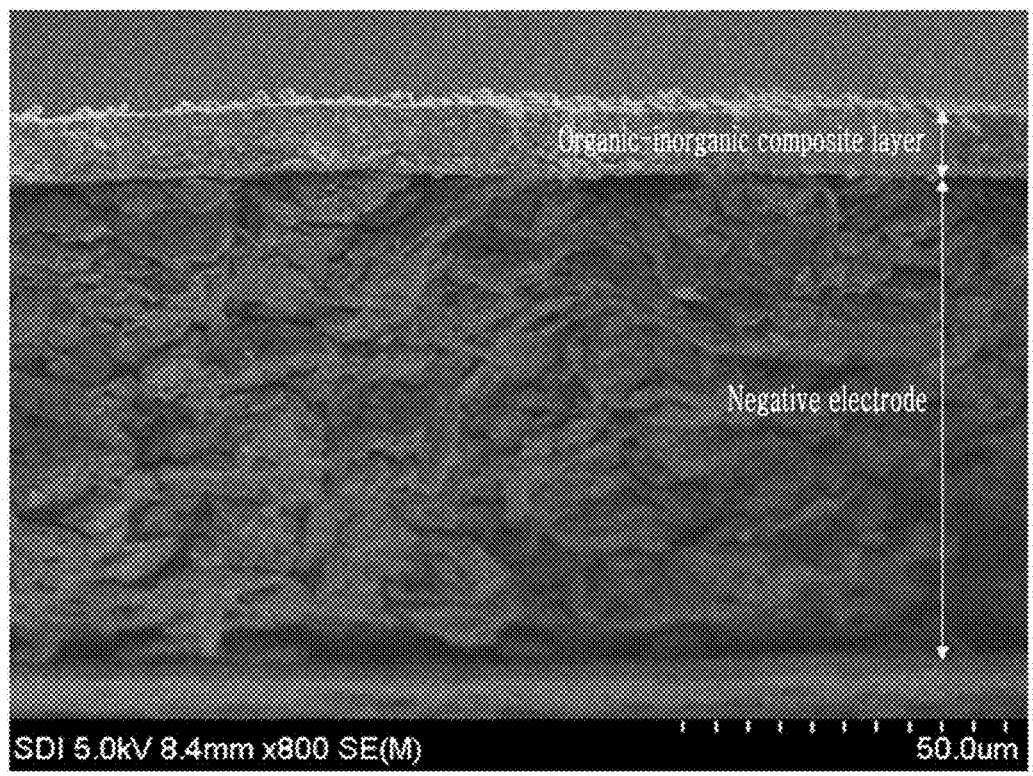
FIG. 1 is a scanning electron microscope (SEM) image of a cross-section of the electrode assembly.

Hereinafter, embodiments of the present disclosure are described in more detail. However, these embodiments are non-limiting example embodiments, the present disclosure is not limited thereto, and the scope of the present disclosure is defined by the scope of the appended claims, and equivalents thereof.

An electrode assembly for a rechargeable lithium battery may include (e.g., consist of) a negative electrode and a positive electrode. The negative electrode includes a current collector, a negative active material layer positioned on the current collector, and an organic-inorganic composite layer integrated with the negative active material layer.

Furthermore, the negative active material layer may include a first layer including a first carbon-based material and a second layer including a second carbon-based material. The first layer may be contacted with the current collector (e.g., may physically contact the current collector) and the second layer may be on the first layer.

Herein, the first layer may have a DD (Degree of Divergence) value of about 30% to about 90% of a DD value of the negative active material layer, for example, that of the total negative active material layer which is a sum of the first layer and second layer, and according to one embodiment, of about 70% to about 90%.

The DD value may be defined by Equation 1.

$$DD(\text{Degree of Divergence}) = (I_a/I_{total})*100 \quad \text{Equation 1}$$

In Equation 1, $I_a$ is a sum of peak intensities at non-planar angles measured by X-ray diffraction (XRD) using a CuKα ray, and, $I_{total}$ is a sum of peak intensities at all angles measured by an XRD using a CuKα ray.

Herein, the non-planar angles denote 2θ=42.4±0.2°, 43.4±0.2°, 44.6±0.2°, and 77.5±0.2° measured by XRD using a CuKα ray, which correspond to a (100) plane, a (101)R plane, a (101)H plane, and a (110) plane, respectively. In general, graphite has a structure classified into a rhombohedral structure and a hexagonal structure having an ABAB type (or kind) of stacking sequence according to a stacking order of graphene layers, and the R plane denotes the rhombohedral structure, while the H plane denotes the hexagonal structure.

In addition, the "all angles" denote 2θ=26.5±0.2°, 42.4±0.2°, 43.4±0.2°, 44.6±0.2°, 54.7±0.2°, and 77.5±0.2° when measured by XRD using a CuKα ray, which correspond to a (002) plane, a (100) plane, a (101)R plane, a (101)H plane, a (004) plane, and a (110) plane, respectively. A peak at 2θ=43.4±0.2° may also appear by overlapping a peak of a (101)R plane of a carbon-based material with another peak of a (111) plane of a current collector, for example, Cu.

In general, peak intensity indicates a height of a peak or an integral area of the peak, and according to an embodiment, the peak intensity indicates the integral area of a peak.

In an embodiment, the XRD is measured by using a CuKα ray as a target ray and is measured under a measurement condition of 2θ=10° to 80°, a scan speed (°/S) of 0.044 to 0.089, and a step size (°/step) of 0.013 to 0.039 by using a CuKα ray as a target ray but removing a monochromator to improve a peak intensity resolution.

Figure 2:
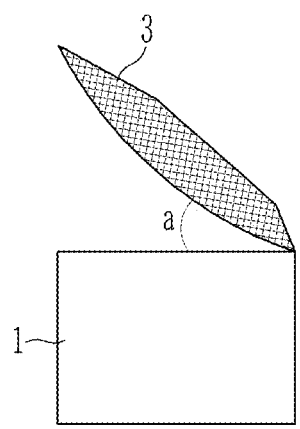
FIG. 2 is a schematic diagram illustrating an orientation of a negative active material relative to a substrate according to one embodiment.

The DD values indicate that the negative active materials included in the first layer and the second layer are oriented at a set or predetermined angle (e.g., relative to a substrate), and a larger value indicates that the negative active material is well oriented. In one or more embodiments, as schematically shown in FIG. 2, as the DD values are increased, an angle (a) is increased when the negative active material 3 is oriented to one side of the substrate 1 with the angle (a). Furthermore, the DD values may be maintained after charges and discharges.

In one embodiment, the DD value of the first layer is smaller than the DD value of the negative active material layer, and it resultantly indicates that the DD value of the first layer is smaller than the DD value of the second layer, because the second layer corresponds to a surface of the negative active material layer.

In one or more embodiments, the DD value of the first layer may be about 30% to about 90% of the DD value of the negative active material layer (first layer+second layer), and more desirably, about 70% to about 90%, which indicates a higher orientation degree of the second layer than that of the first layer (e.g., a higher degree of orientation of the negative active material of the second layer (e.g., the second carbon-based material) relative to the substrate than the degree of orientation of the negative active material of the first layer (e.g., the first carbon-based material) relative to the substrate). As such, because the higher orientation degree of the second layer corresponding to a surface portion of the negative active material layer indicates that the negative active material is not horizontal and parallel to the current collector and is positioned in a standing state at a set or predetermined angle to the current collector. This allows the electrolyte to be readily immersed in the negative active material layer, to easily transfer lithium ions, and to shorten a transferring path (e.g., a transfer path of lithium ions), and thus, the resulting negative electrode may be suitably applied in a high-power battery and may exhibit excellent high-rate characteristics.

If the DD value of the first layer is smaller than about 30% of the DD value of the negative active material layer, the impregnation of the electrolyte may be deteriorated or reduced, and lithium ions may not be completely intercalated into the first layer. Whereas, if the DD value of the first layer is larger than about 90% of the DD value of the negative active material layer, shortcomings related to contacts between particles to increase electrical resistance of the negative electrode may occur.

Furthermore, if the DD values of the first layer and the second layer which are separately stacked are not different from each other, and the DD values are different for each zone in one layer, migration of a binder may be generated according to an orientation part and a non-orientation part during drying which cause a decrease in adhesion and an increase in ionic resistance of the negative electrode. In addition, the ability of the electrolyte to be immersed in the negative active material layer may be changed according to the oriented part and the non-oriented part which increases non-uniformity of the reaction and causes partially non-uniform thickness of the negative active material layer when fully charging, thereby causing leakage of Li during charging at high rates of 1 C or more.

The negative active material layer may have a DD value of about 19 to about 60, and the first layer may have a DD value of about 18 to about 54. When the DD values of the negative active material layer and the first layer have the above relationship and satisfy the above range, the electrolyte may be effectively impregnated into the negative active material layer, lithium ions may be readily moved, and the moving path may be shortened, and thus, the negative electrode including the same may be utilized in a high-power battery and the electron transferring resistance may be reduced in the negative electrode, thereby improving high rate characteristics. If the DD value of the negative active material layer or the DD values of the first layer are outside of the above range, the impregnation of the electrolyte may be deteriorated or reduced, and lithium ions may not be suitably or completely intercalated into the first layer at high-rate charge.

According to one embodiment, the negative electrode may include an organic-inorganic composite layer integrated with the negative active material layer, and the organic-inorganic composite layer may include an organic layer and an inorganic layer.

The organic-inorganic composite layer is located between the positive electrode and the negative electrode to act as a separator that prevents (or reduces a likelihood or occurrence of) a short circuit, so that the electrode assembly for a rechargeable lithium battery does not include (or does not require) any additional separator. Accordingly, in embodiments of the rechargeable lithium battery the organic-inorganic composite layer functions as a separator, and the rechargeable lithium battery does not include any additional separator.

As the electrode assembly for the rechargeable lithium battery according to one embodiment does not include an additional separator, a lamination process for combining a separator and an electrode may not be necessary, and thus, the battery may be economically fabricated (e.g., may be fabricated more economically than a similar electrode that is laminated together with a separator).

Furthermore, the integration of the organic-inorganic composite layer with the negative active material layer does not indicate that the organic-inorganic composite layer is separately formed from the negative active material layer, for example, that the organic-inorganic composite layer is a layer separate from the negative active material layer. It refers to a state in which the negative active material layer and the organic-inorganic composite layer are more firmly bonded, as the negative active material layer is partially immersed and dried by directly forming the organic-inorganic composite layer on the negative active material layer. As described above, the integration of the organic-inorganic composite layer with the negative active material layer may be clearly shown from the negative active material being distinguished from the organic-inorganic composite layer, but the interface (boundary part) has unevenness (e.g., is unflat, or not flat), when the electrode assembly is measured or analyzed by a scanning electron microscope (SEM) and/or the like (with reference with FIG. 1).

As the organic-inorganic composite layer is integrated with the negative active material layer, it may be presented in a more firmly combined form with the negative active material layer. Furthermore, a polypropylene film which is used as a separator may cause size changes due to heat shrinkage as the repeated charge and discharge proceeds, thereby insufficiently separating the positive electrode and the negative electrode, which causes shortcomings such as a short-circuit, but the electrode assembly according to one or more embodiments of the present disclosure does not cause the shortcomings such as heat-shrinkage, as the organic-inorganic composite layer which acts as a separator is integrated with the negative active material layer.

In addition, as the organic-inorganic composite layer is integrated with the negative active material layer, heat resistance and insulation may be improved, and resistance (e.g., electrical resistance) may be reduced. If an organic-inorganic composite layer and a negative active material layer are separately formed and then they are combined, without forming the organic-inorganic composite layer integrated with the negative active material layer according to embodiments of the present disclosure, resistance to transfer of lithium ions may be increased and an additional process for subsequently integrating the negative active material layer and the organic-inorganic composite layer together may also be required.

Furthermore, the organic-inorganic composite layer according to one or more embodiments may be a two-layer structure including an organic layer and an inorganic layer. Herein, the order of the organic layer and the inorganic layer may be that the organic layer may be positioned to be contacted with (e.g., may physically contact) the negative active material. In one or more embodiments, the inorganic layer may also be positioned to be contacted with (e.g., may physically contact) the negative active material layer.

Figure 3:
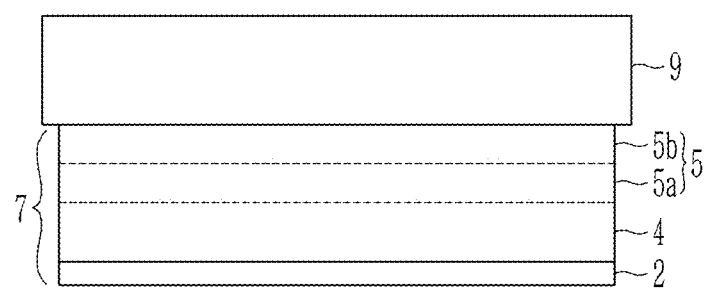
FIG. 3 is a drawing showing an electrode assembly for a rechargeable lithium battery according to one embodiment.

Such an electrode assembly 10, as shown in FIG. 3, may include a negative electrode 7 and a positive electrode 9, and the negative electrode 7 may include a current collector 2, a negative active material layer 4, and an organic-inorganic composite layer 5. The organic-inorganic composite layer 5 may include a first layer 5a and a second layer 5b. When the first layer 5a is an organic layer, the second layer 5b is an inorganic layer. In one or more embodiments, when the first layer 5a is an inorganic layer, the second layer 5b is an organic layer.

FIG. 3 shows that the negative active material layer 4 and organic-inorganic composite layer 5 are separated layers, but this is done merely to distinguish the negative active material layer and the organic-inorganic composite layer from each other. In FIG. 3, dotted lines indicate that the negative active material layer and the organic-inorganic composite layer are integrated with each other. Furthermore, as the first layer and the second layer are permeated with each other to form a composite layer, this is also indicated by a dotted line.

As the negative active material layer is integrated with the organic-inorganic composite layer in the electrode assembly according to one embodiment, the size of the negative active material may be substantially identical to the organic-inorganic composite layer in a width direction (e.g., length direction).

The organic layer may include a heat resistant polymer, and the heat resistant polymer may have a high heat resistant engineering resin. The heat resistant polymer may include, for example, a polyolefin-based polymer (e.g., polyethylene (PE), polypropylene (PP)), polyester, polyamide, polyimide (PI), polyamide imide (PAI), polyether imide, polyacrylonitrile (PAN), polyvinylidene fluoride (PVDF), polyvinylidene fluoride-hexafluoropropylene (PVDF-HFP), polycarbonate (PC), polyvinyl chloride (PVC), polyvinylidene chloride, a polyethylene glycol derivative, polyoxide, polyvinyl acetate, polystyrene (PS), polyvinylpyrrolidone (PVP), a copolymer thereof, or a combination thereof.

The heat resistant polymer may be a non-aqueous polymer. If an aqueous polymer is used, it is not desirable as it is difficult to form fibers by electrospinning.

The inorganic layer may include an inorganic material selected from alumina ($Al_2O_3$), boehmite (aluminum oxide hydroxide), zirconia, titanium oxide ($TiO_2$), silica ($SiO_2$), and a combination thereof.

In one embodiment, the thickness of the organic layer may be about 1 μm to about 20 μm, or about 8 μm to about 10 μm. In the present specification, the thickness of the organic layer refers to a region in which organic material is presented in the organic-inorganic composite layer integrated with the negative active material layer, and does not refer to a thickness of a region in which the organic material is separately presented. When the thickness of the organic layer satisfies the above range of thickness, a suitable high density may be obtained, and thus, generation of Li dendrites during charge and discharge may be effectively prevented or reduced.

As such, the negative electrode includes the organic layer and the inorganic layer, and thus, a heat resistance effect and flexibility owing to inclusion of a polymer, for example, a heat resistant polymer, may be imparted to the negative electrode. Accordingly, damage to the negative electrode may be suppressed or reduced during the battery fabrication, the generation of lithium dendrites may be effectively suppressed or reduced during charge and discharge, and the increases in heat resistance and mechanical strength owing an inclusion of an inorganic material may be obtained. Such effects are difficult to obtain from one layer which is prepared by mixing the polymer and the inorganic material.

In a case of only including an organic layer, for example, an organic layer prepared by electrospinning, rather than the organic-inorganic composite layer, as the organic layer has a woven state, for example, a network structure, the positive electrode may be directly contacted to (e.g., may physically contact) the negative electrode during the charge and discharge to cause a short-circuit, and thus, it may be unsuitable or impossible to use a battery including such an organic layer. In a case of only including an organic layer, even though the organic layer is formed with a 2-layer structure, similar problems to those described above may be caused.

In one or more embodiments, in a case of including only an inorganic layer without an organic layer, the flexibility of the negative electrode is not suitable or satisfied, and thus, particles of the inorganic layer may be separated in assembling of the battery, thereby generating Li dendrites which cause a short-circuit.

A thickness of the inorganic layer may be about 1 μm to about 25 μm, or about 10 μm to about 14 μm. In the present specification, the thickness of the inorganic layer refers to a region in which inorganic material is presented in the organic-inorganic composite layer integrated with the negative active material layer, and does not refer to a thickness of a region in which the inorganic material is separately presented. When the thickness of the inorganic layer is within the range, a density of the inorganic layer may be suitably improved to slightly suppress or reduce generation of Li dendrites.

Such an organic layer may have a woven state, for example, a network structure, and the organic layer with the network structure may be prepared by, e.g., electrospinning. However, the preparation of the organic layer is not limited to electrospinning, and may include any suitable procedures generally used in the art, as long as a suitable organic layer may be prepared. As such, when the organic layer has the woven state, for example, the network structure, it may minimize or reduce a resistance for transferring Li ions. The organic layer has the woven state which indicates a porous layer in which pores are formed. If the organic layer is prepared as a dense layer, a distance for transferring Li ions is increased to relatively increase Li ion transferring resistance, and it may be separated from the active material layer and it is not integrated with the active material layer.

The inorganic layer may be presented as a dense layer, and such an inorganic layer may be prepared by, e.g., electrospraying. However, the preparation of the inorganic layer is not limited to electrospraying, and may include any suitable procedures used in the art, such as, for example, doctor blade coating and/or the like, as long as the inorganic layer may be prepared as a dense layer. When the inorganic layer is presented as the dense layer, the generation of Li dendrites may be effectively suppressed or reduced. If the inorganic layer is presented as a porous layer, a short circuit may occur during charge and discharge.

As described above, the electrode assembly including the negative electrode which includes the first layer presented inside to contact the current collector, having the smaller DD values than that of the second layer, e.g., the first layer having a smaller DD value than that of the negative active material as the negative active material layer is integrated with the organic-inorganic composite layer, it may exhibit excellent rate-capability and cycle-life characteristics, and may reduce battery resistance, for example, ionic resistance.

The effects of embodiments of the present disclosure cannot be obtained if the DD value of the first layer is larger than that of the second layer, even though the organic-inorganic composite layer is integrated with the negative active material layer. This is considered to be due to the difference of a lithium ion delivery speed caused by the electrolyte impregnation speed. For example, according to embodiments of the present disclosure, the DD value of the second layer is larger than that of the first layer which indicates a higher standing degree of the negative active material, and it also indicates that the porosity of the second layer is larger than that of the first layer. High porosity indicates a faster electrolyte impregnation speed, which causes a difference of the ion transportation speed. It may be considered that this difference will become larger as the layer is thicker. Or, if the negative active material layer has only one layer with any DD value, rather than the first layer and the second layer having different DD values, a difference of the electrolyte impregnation speed relatively occurs to have no desired effects, even though the organic-inorganic composite layer is integrated with the negative active material layer. For example, the single layer indicates that an overall structure of the negative electrode is the same, and thus, it is expected that the electrolyte impregnation speed in the upper layer is the same as that of the lower layer. As a result, the improvements in the electrolyte impregnation characteristic may not be obtained. The charge characteristics may be improved from the excellent electrolyte impregnation characteristics, and the improvements in the electrolyte impregnation characteristic may be obtained from a larger amount of the electrolyte injected to the upper layer (for example, the impregnation speed of the upper layer is faster) which allows the electrolyte to smoothly and well impregnate the lower layer. Accordingly, when the first and second layers having different DD values are included, the improved electrolyte impregnation characteristics may be obtained.

In one or more embodiments, the first layer included in the negative active material layer may have a thickness (cross-section) of about 40 μm to about 400 μm. In the present specification, the thickness refers to a thickness of the cross-section, and thus, when the first layer and the second layer are on both sides of the current collector in the negative electrode, a total thickness may be twice the thickness of the cross-section, which is consistent with the general measuring practice in the art to which this disclosure pertains.

When the thickness of the first layer is within the above range, the ionic transportation resistance in the negative electrode may be reduced.

The thickness of the first layer may be about 80% or less of the thickness of the negative active material layer, and according to one embodiment, may be about 20% to 80%. When the ratio of the thickness of the negative active material layer and the first layer satisfies the above range, the electrolyte impregnation as well as the electron transportation resistance of the active material layer in the negative electrode may be improved.

Furthermore, the second layer may have a thickness (cross-section) of about 10 μm to about 100 μm. When the thickness of the second layer is within the above range, the electrolyte is readily impregnated in the negative electrode to reduce the ionic transportation resistance in the negative electrode.

The thickness of the negative active material layer, e.g., a sum of the thickness of the first layer and the thickness of the second layer, may be about 50 μm to about 500 μm. Thus, if the first layer and the second layer are on both sides of the current collector, the negative active material layer may be formed at a thickness of a maximum of about 1000 μm which is extremely larger than the general maximum thickness of the negative active material layer on both sides of about 200 μm. In one embodiment, the DD values of the first layer which is an inner layer and the negative active material layer are controlled to improve the electrolyte impregnation. Thus, a thick layer with the thicker thickness is formed, so that rapid charge and discharge may effectively occur so that it may be utilized in a high-power battery.

The thicknesses of the negative active material layer and the first layer refer to a thickness after compressing and vacuum-drying the negative electrode preparation. The vacuum-drying may be performed under a pressure of about 0.03 atm to about 0.06 atm at a temperature of about 100° C. to about 160° C.

In one embodiment, the DD value is obtained by charging and discharging a rechargeable lithium battery including the negative electrode, disassembling the battery when completely discharged to obtain the negative electrode, and measuring the negative electrode by XRD. The DD value of the first layer is obtained by taking off the negative active material layer using tape after charge and discharge and measuring the active material layer attached to the current collector by XRD.

Herein, the charge and discharge are performed once or twice at about 0.1 C to about 0.2 C.

The negative electrode may have a peak intensity ratio at a (004) plane relative to a (002) plane, for example, $I_{(004)}/I_{(002)}$, of greater than or equal to about 0.04, and, for example, of greater than or equal to about 0.04 to less than or equal to about 0.07 when XRD is measured by using a CuKα ray. When the negative electrode has $I_{(004)}/I_{(002)}$ of greater than or equal to about 0.04, DC internal resistance may not be increased, but rate capabilities and, for example, high rate capability may be improved, and cycle-life characteristics may also be improved.

In addition, the negative electrode may have a peak intensity ratio at a (110) plane relative to a (004) plane, for example, $I_{(110)}/I_{(004)}$, of greater than or equal to about 0.3, and, for example, greater than or equal to about 0.3 and less than or equal to about 0.7 when XRD is measured by using a CuKα ray. When the negative electrode has $I_{(110)}/I_{(004)}$ of greater than or equal to about 0.3, DC internal resistance may not be increased, but rate capabilities and, for example, high rate capability may be improved, and cycle-life characteristics may also be improved. In an embodiment, because the DD value is a peak value at a non-plane relative to a peak value at all the angles, and thus, is not linked with $I_{(110)}/I_{(004)}$, the $I_{(110)}/I_{(004)}$ of greater than or equal to about 0.3 does not necessarily mean the DD values of the first layer and the second layer within the above range.

A BET specific surface area of the negative electrode may be less than about 5.0 m²/g, or about 0.6 m²/g to about 2.0 m²/g. When the BET specific surface area of the negative electrode is less than about 5.0 m²/g, the electrochemical cycle-life characteristics of the battery may be improved. In an embodiment, the BET is measured by charging and discharging a lithium rechargeable battery including the negative electrode, completely discharging the battery down to less than or equal to about 3 V, disassembling the battery to obtain the negative electrode, cutting the negative electrode into a set or predetermined size, and putting the cut negative electrode in a BET sample holder in a nitrogen gas adsorption method.

The negative electrode may have a cross-section loading level (L/L) of about 6 mg/cm² to about 65 mg/cm².

In one embodiment, the negative active material included in the negative active material layer may be a carbon-based active material. The carbon-based negative active material may be crystalline carbon-based material such as artificial graphite, or a mixture of artificial graphite and natural graphite. When the negative active material is a crystalline carbon-based material such as artificial graphite or a mixture of natural graphite and artificial graphite, the crystalline carbon-based material has more developed crystalline characteristics than an amorphous carbon-based active material, and thus, may further improve orientation characteristics of a carbon material in an electrode with respect to an external magnetic field. The artificial graphite or natural graphite may be unspecified shaped, sheet-shaped, flake-shaped, spherically-shaped, fiber-shaped, or a combination thereof without a particular limit. In addition, the artificial graphite is mixed with the natural graphite in a ratio of about 70:30 wt % to about 95:5 wt %.

Furthermore, the negative active material layer may include at least one non-carbon-based material such as, for example, a Si-based negative active material, a Sn-based negative active material, and/or a lithium vanadium oxide negative active material. When the negative active material layer further includes these materials, for example, the carbon-based negative active material as a first negative active material and the non-carbon-based material as a second negative active material, the first and second negative active materials may be mixed in a weight ratio of about 50:50 to about 99:1.

The Si-based negative active material may include Si, a Si—C composite, $SiO_x$ (0<x<2), and/or an Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof but not Si), and the Sn-based negative active material is selected from Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof but not Si), and the like, and also, a mixture of at least one thereof with $SiO_2$. The elements Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

In the first layer, the amount of the negative active material may be about 95 wt % to about 99 wt % based on the total weight of the first layer, and in the second layer, the amount of negative active material may be about 95 wt % to about 99 wt % based on the total weight of the second layer.

The first layer and the second layer include a binder, and may further include a conductive material (e.g., an electrically conductive material). In the first layer and/or the second layer, each amount of the binder may be about 1 wt % to about 5 wt % based on the total weight of the first layer or the second layer. When the conductive material is further included, about 90 wt % to about 98 wt % of the negative active material, about 1 wt % to about 5 wt % of the binder, and about 1 wt % to about 5 wt % of the conductive material may be included.

The binder improves binding properties of negative active material particles with one another and with a current collector. The binder may be a non-aqueous binder, an aqueous binder, or a combination thereof.

The non-aqueous binder may be an ethylene propylene copolymer, polyacrylonitrile, polystyrene, polyvinylchloride, carboxylated polyvinylchloride, polyvinylfluoride, polyurethane, polytetrafluoro ethylene, polyvinylidene fluoride, polyethylene, polypropylene, polyamide imide, polyimide, or a combination thereof.

The aqueous binder may be a styrene-butadiene rubber (SBR), an acrylated styrene-butadiene rubber (ABR), an acrylonitrile-butadiene rubber, an acrylic rubber, a butyl rubber, a fluorine rubber, an ethylene oxide-containing polymer, polyvinyl pyrrolidone, polypropylene, polyepichlorohydrine, polyphosphazene, an ethylene propylene diene copolymer, polyvinylpyridine, chlorosulfonated polyethylene, latex, a polyester resin, an acrylic resin, a phenolic resin, an epoxy resin, polyvinyl alcohol, or a combination thereof.

When the aqueous binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metal may be Na, K, or Li. The thickener may be included in an amount of about 0.1 parts by weight to about 3 parts by weight based on 100 parts by weight of the negative active material.

The conductive material is included to provide electrode conductivity (e.g., electrical conductivity). Any suitable electrically conductive material may be used as a conductive material unless it causes a chemical change (e.g., an unsuitable chemical change in the rechargeable lithium battery). Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof, but is not limited thereto.

The electrode assembly according to one embodiment may be prepared by the following procedure.

First of all, a negative active material layer is formed on a current collector. The negative active material layer may be prepared by applying a magnetic field when a negative active material composition is coated on the current collector. The negative active material layer preparation will be illustrated, with reference to FIG. 4.

Figure 4:
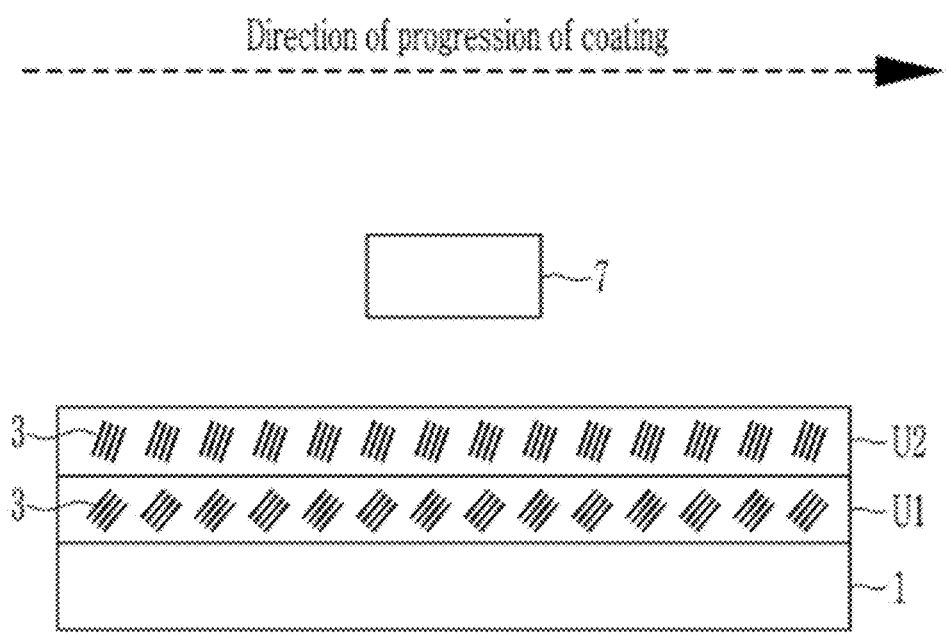
FIG. 4 is a drawing schematically showing a negative active material layer preparation according one embodiment.

As shown in FIG. 4, a current collector 1 is located beneath a magnet 7 and a first layer composition including a negative active material 3 is coated on the current collector 1. After coating the first layer composition, drying is performed to prepare a first layer U1. Thereafter, a second layer composition including a negative active material 3 is coated on the first layer, and dried to prepare a second layer U2. In one or more embodiments, the first layer and the second layer preparations may be concurrently (e.g., simultaneously) performed by coating the first layer composition and the second layer composition. Herein, the coating may be performed together with drying so that the coating and the drying of the first layer composition and the second layer composition concurrently (e.g., simultaneously) occur. As a result, the first layer and the second layer are not prepared as one layer without a boundary and may be separately prepared.

If the first layer and the second layer compositions are formed on both sides of the current collector, one first layer is formed on one side of the current collector, the other first layer is formed on a side corresponding to where the first layer is not formed, and second layers are formed on the two first layers, respectively. In one or more embodiments, a first layer and a second layer may be sequentially formed on one side of the current collector, and a first layer and a second layer may be sequentially formed on the side corresponding to the other side of the current collector.

The magnet 7 may have a magnetic field strength of about 1000 Gauss to about 10,000 Gauss. In addition, the negative active material composition may be coated on the current collector and maintained for about 3 seconds to about 9 seconds, for example, may be exposed to the magnetic field for about 3 seconds to about 9 seconds.

When such applying of the magnetic field is performed, for example, when the coating process is performed while the current collector is moved, the magnetic field (magnetic flux) of the magnet may be formed vertically with respect to the current collector, but because the magnetic field according to a coating speed (a speed of moving the current collector) is formed at a set or predetermined angle as a vector function, the negative active material included in the first and second compositions may stand, for example, may be oriented at the set or predetermined angle on the surface of the current collector.

For example, when the coating process is performed while the current collector is moved, the magnetic field (magnetic flux) of the magnet may be formed vertically with respect to the current collector, but because the magnetic field according to a coating speed (a speed of moving the current collector) is formed at a set or predetermined angle as a vector function, the negative active material included in the negative active material composition may stand, for example, may be oriented at the set or predetermined angle on the surface of the current collector.

Herein, the viscosities of the first layer composition and the second layer composition are adjusted to form the first layer and the second layer with different DD values, even though the same magnetic fields are applied for the first layer and the second layer preparations. Thus, the degree of the orientation of the negative active materials in the first layer U1 and the second layer U2 may be differentiated, as shown in FIG. 4.

In one or more embodiments, the first layer composition may have a viscosity of about 2500 cps to 3500 cps, and in one embodiment, about 2500 cps to about 3000 cps at room temperature (about 20° C. to about 25° C.). The second layer composition may have viscosity of about 2000 cps to about 3000 cps, and in one embodiment, may be about 2000 cps to about 2500 cps at room temperature (about 20° C. to about 25° C.). The viscosities of the first layer composition and the second layer composition may be controlled within the above range, but the viscosity of the first layer composition may be selected to be higher than the viscosity of the second layer composition. For example, the viscosity of the first layer composition may suitably be higher by about 100 cps to about 1500 cps than the viscosity of the second layer composition. In this case, the first layer and the second layer with the desired DD values may be obtained. If the composition with a viscosity out of the range is used, the DD value according to one embodiment may not be obtained, even though the magnetic field of about 1000 Gauss to about 10,000 Gauss is applied.

When the viscosities of the first layer composition and the second layer composition satisfy the above range, the first layer and the second layer with the desired DD values may be obtained. Lower viscosity of the first layer composition than the above range may cause an extreme increase in a degree of verticality of the first carbon-based negative active material included in the first layer, for example, the angle a shown in FIG. 2, thereby causing poor particle contact of the negative active material to the substrate, and thus, the electron transportation resistance may be increased. Whereas, a higher viscosity than the above range may be unable to orientate (or may be unable to suitably orient the negative active material), for example, the first negative active material included in the first layer may be substantially horizontally positioned relative to the substrate (e.g., the current collector).

If the second layer composition has a higher viscosity than the above range, the second carbon-based negative active material included in the second layer has an extremely high degree of verticality which causes poor contact of the negative active material particles, and thus, the electron transportation resistance of the negative active material layer may be increased. Whereas, if the viscosity is larger than the range, the orientation may insufficiently occur to deteriorate or reduce the electrolyte impregnation of the negative active material layer.

The first layer composition and the second layer composition may be respectively produced by mixing the negative active material, the binder, and optionally the conductive material in a solvent.

The negative active material is the same as the above description.

Thereafter, after the first layer and the second layer are formed, compression and vacuum-drying may be performed. The vacuum-drying may be performed under a pressure of about 0.03 atm to about 0.06 atm at a temperature of about 100° C. to about 160° C.

An organic-inorganic composite layer including an organic layer and an inorganic layer is formed on the negative active material layer to prepare a negative electrode in which the negative active material layer is integrated with the organic-inorganic composite layer.

Regardless of the order of preparing the organic layer or the inorganic layer, the organic layer may be formed by electrospinning a composition for preparing an organic layer on a substrate. The composition for preparing the organic layer may include a polymer and a solvent.

The electrospinning may be performed by positioning one nozzle pack including a tip in which a hole size may be about 23 G (gauge) to 30 G, and a collector roller at a set or predetermined gap, adding the composition for preparing the organic layer to the tip, positioning the substrate on the collector roller, and applying a voltage of about 35 kV to about 50 kV to the tip. The number of tips may be suitably controlled according to the amount, types (e.g., composition), etc., of the polymer included in the composition for preparing the organic layer, and for example, may be about 20 tips to 60 tips.

The set or predetermined gap between the nozzle pack and the substrate may be about 10 cm to about 20 cm.

If the hole size of the tip is about 25 G to about 30 G, it is suitable or desirable because the organic layer of a suitable or desired type may be obtained.

According to the electrospinning, the composition, e.g., a polymer solution, is sprayed and stretched in the form of fibers to be spun on the substrate in a form of a cone, thereby obtaining an organic layer. While the present disclosure is not limited by any particular mechanism or theory, it is believed that during the organic layer preparation, the composition for preparing the organic layer hangs at the tip end in the form of drops due to the surface tension of the composition, and applying a voltage generates a repulsive force of the electric charges to start distortion thereof in the opposite direction to the surface tension, and when a critical voltage is reached, the polymer solution is sprayed from the end point of the droplet and the collector roller collects a spraying material called a Taylor cone to prepare an organic layer.

Herein, the electrospinning may be performed under a condition of a temperature of about 20° C. to about 30° C. and a relative humidity of about 40% to about 60%. When the electrospinning is performed under the above condition of the temperature and the relative humidity, the spinning may be performed while the thickness of fibers may be uniformly (e.g., substantially uniformly) maintained.

Furthermore, the roll speed of the collector roller may be adjusted in order to prepare an organic layer having suitable thickness, and for example, may be about 1 m/min to about 3 m/min. In addition, the speed may be controlled in order to emit a solid content at a speed of about 20 µl/min to about 200 µl/min in the composition for preparing the organic layer discharged from the tip.

Furthermore, tip air may be suitably controlled by minimizing or reducing interference between tips to produce uniform (e.g., substantially uniform) electrospinning. The control for the tip air may be adjusted by flowing compressed air at a pressure of about 0.1 MPa to about 0.2 MPa.

After the electrospinning is performed, drying may be performed using hot air a temperature of about 70° C. to about 110° C.

In the composition for preparing the organic layer, the polymer may be one or a mixture of at least one selected from the above polymers, and the solvent may be dimethyl acetate, dimethylformamide, acetone, or a combination thereof.

As the polymer may be the heat resistant polymer and the heat resistant polymer is non-aqueous, the solvent may be the organic solvent. Use of an aqueous polymer requires use of a water solvent which causes difficulty in electrospinning and damage to the electrode, for example, by causing spring back, but one or more embodiments of the present disclosure utilize organic solvents, and thus, the shortcomings caused from the use of a water solvent, may not occur.

In the composition for preparing the organic layer, the amount of the polymer may be about 5 wt % to about 20 wt % based on the total weight, 100 wt %, of the composition. When the amount of the polymer is within the above range, the organic layer having a suitable thickness may be prepared. If the amount of the polymer is less than about 5 wt %, it is difficult to form fiber during the electrospinning. Whereas, a larger amount than about 20 wt % causes the tip to block during the electrospinning, and thus, the spinning is impossible or unsuitable, or the thickness of the fibers is non-uniform and thicker than desired.

The organic layer is formed by electrospinning, and thus, the resulting organic layer may have a woven state, for example, a network structure. If the organic layer is prepared by directly coating the composition on the substrate, or dipping the substrate in the composition, rather than electrospinning, the organic layer may be densely prepared and the thickness of the electrode may be extremely increased due to the solvent remaining in the electrode to not suitably improve energy density per volume of the battery. Furthermore, the dense organic layer, itself, acts as a resistance layer to increase Li ion transportation resistance, and thus the battery performances may be deteriorated or reduced. According to one or more embodiments, the organic layer is prepared by electrospinning, the solvent may be well volatilized, and the spring back phenomenon in which the solvent damages the negative electrode may be effectively suppressed or reduced.

The inorganic layer may be prepared by electrospraying a composition for preparing the inorganic layer on a substrate. The composition for preparing the inorganic layer may include an inorganic material, a binder, and a solvent.

The electrospraying may be performed by positioning one nozzle pack including a tip in which a hole size may be about 23 G (gauge) to 30 G, and a collector roller at a set or predetermined gap, adding the composition for preparing the inorganic layer to the tip, positioning the substrate on the collector roller, and applying a voltage of about 35 kV to about 50 kV to the tip.

The number of tips may be suitably controlled according to the amount, types (e.g., composition), etc., of a polymer included in the composition for preparing the inorganic layer, and for example, may be about 20 tips to 60 tips.

The set or predetermined gap between the nozzle pack and the substrate may be about 10 cm to about 20 cm.

If the hole size of the tip is about 25 G to about 30 G, it is suitable or desirable because an inorganic layer of a suitable or desired type may be obtained.

According to the electrospraying, the composition for preparing the inorganic layer is sprayed as a dot type (or kind) on the substrate to prepare an inorganic layer. If the inorganic layer is prepared by directly coating the composition on the substrate, or dipping the substrate into the composition, rather than electrospraying, the thickness of the electrode may be extremely increased due to the solvent remaining in the electrode to not suitably improve energy density per volume of the battery. Furthermore, the inorganic layer is performed by the electrospinning so that the solvent may be well volatilized, thereby preventing or reducing the spring back phenomenon and preventing or reducing damage to the negative electrode by the solvent.

Furthermore, the roll speed of the collector roller may be adjusted in order to prepare an organic layer having a suitable thickness, and for example, may be about 0.5 m/min to about 3 m/min. In addition, the speed may be controlled in order to emit a solid content at a speed of about 20 µl/min to about 200 µl/min in the composition for preparing the inorganic layer discharged from the tip.

Furthermore, a tip air may suitably be controlled by minimizing or reducing the interference between tips to provide uniform (e.g., substantially uniform) electrospraying. The control for the tip air may be adjusted by flowing compressed air at a pressure of about 0.1 MPa to about 0.2 MPa.

After the electrospinning is performed, drying may be performed using hot air at a temperature of about 70° C. to about 110° C.

In the composition for preparing the inorganic layer, the inorganic material may be the same as the above polymers and the solvent may be dimethyl acetate, N-methylpyrrolidone, dimethylformamide, acetone, or a combination thereof. The binder may be polyvinylidene fluoride, polyamide imide, polyvinylpyrrolidone, polyacrylonitrile, a copolymer thereof, or a combination thereof. An amount of the inorganic material in the composition for preparing the inorganic layer may be about 85 wt % to about 96 wt % based on the total weight, 100 wt %, of the composition.

After the organic-inorganic composite layer is prepared, roll pressing may be further performed. The roll pressing may be performed at a temperature of about 25° C. to about 110° C. When the roll pressing is further performed, the organic-inorganic composite layer is compressed to shorten a path for transferring Li ions, thereby obtaining features related to transferring lithium ions during charge and discharge.

As the composition for preparing the organic layer is prepared by electrospinning, the composition for preparing the organic layer is immersed into pores which may be naturally formed in the negative active material layer and integrated, and also, the electrospinning allows preparation of the organic layer in the woven state, for example, the network type (or kind), and the composition for preparing the inorganic layer is immersed into pores of the network type (or kind) to prepare an organic-inorganic composite which is integrated with the negative active material layer.

Furthermore, in a case of firstly preparing the inorganic layer, the composition for preparing the inorganic layer may be immersed in pores which may be naturally formed to integrate therewith, and the composition for preparing the organic layer then undergoes electrospinning to slightly immerse it the inorganic layer, thereby integrating the organic-inorganic layer and the negative active material layer.

Such integration may be effectively obtained by further performing roll-pressing.

Thereafter, the negative electrode may be positioned to be contacted with (e.g., may physically contact) the positive electrode to prepare an electrode assembly. Herein, the positive electrode may be positioned to be contacted with (e.g., may physically contact) the organic-inorganic composite layer.

The positive electrode may include a current collector and a positive active material layer on the current collector. The positive active material may include lithiated intercalation compounds that reversibly intercalate and deintercalate lithium ions. For example, one or more composite oxides of a metal selected from cobalt, manganese, nickel, and a combination thereof, and lithium, may be used. In one or more embodiments, the compounds represented by one of the following chemical formulae may be used. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_{b-}Co_cMn_dGeO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$) $Li_aCoG_bO_2$ ($0.90 \leq a \leq 1.8$, $0.001 \leq b \leq 0.1$); $Li_aMn_{1-b}GbO_2$ ($0.90 \leq a \leq 1.8$, $0.001 \leq b \leq 0.1$); $Li_aMn_2GbO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4Li_{(3-f)}J_2PO_{43}$ ($0 \leq f \leq 2$); $Li_{(3-f)}Fe_2PO_{43}$ ($0 \leq f \leq 2$); $Li_aFePO_4$ ($0.90 \leq a \leq 1.8$)

In the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of the coating element, a hydroxide of the coating element, an oxyhydroxide of the coating element, an oxycarbonate of the coating element, or a hydroxyl carbonate of the coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be formed utilizing a method having no (or substantially no) adverse influence on properties of a positive active material by using these elements in the compound. For example, the method may include any suitable coating method such as spray coating, dipping, and/or the like, but is not illustrated in more detail because it should be readily recognized by those of ordinary skill in the art to which this disclosure pertains.

In the positive electrode, an amount of the positive active material may be about 90 wt % to about 98 wt % based on the total weight of the positive active material layer.

In an embodiment, the positive active material layer may further include a binder and a conductive material. Herein, the binder and the conductive material may be included in an amount of about 1 wt % to about 5 wt %, respectively based on the total amount of the positive active material layer.

The binder improves binding properties of positive active material particles with one another and with a current collector. Examples thereof may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene butadiene rubber, an acrylated styrene butadiene rubber, an epoxy resin, nylon, and the like, but are not limited thereto.

The conductive material is included to provide electrode conductivity (e.g., electrical conductivity). Any suitable electrically conductive material may be used as a conductive material unless it causes a chemical change in the rechargeable lithium battery. Examples of the conductive material may include a carbon-based material such as natural graphite, artificial graphite, carbon black, acetylene black, ketjen black, a carbon fiber, and the like; a metal-based material of a metal powder and/or a metal fiber including copper, nickel, aluminum, silver, and/or the like; a conductive polymer such as a polyphenylene derivative; or a mixture thereof.

The current collector may include Al, but is not limited thereto.

A rechargeable lithium battery according to one embodiment may include the electrode assembly and an electrolyte.

The rechargeable lithium battery may be a battery having high power. For example, the rechargeable lithium battery may be utilized for electronic devices requiring high power, such as driver tools, vehicles, cleaners, and/or the like. The rechargeable lithium battery including the negative electrode according to one embodiment may easily emit heat generated by charging and discharging, and, for example, heat generated from a cell for high capacity or electric devices for high power using the battery at charge and discharge, and thus, battery deterioration due to heat generation may suppressed or reduced and it may be effectively used as a high power battery. In addition, the easy heat emission allows the rechargeable lithium battery to effectively suppress or reduce an increase in temperature of the battery, and thus the cycle-life characteristics, especially the cycle-life characteristics at high rates, may be effectively improved.

Such a battery for high power may be a cylindrical battery, a pouch-type battery (a pouch kind of battery), or a stack-type battery (a stack kind of battery). Furthermore, the cylindrical battery may be a large-sized battery, such as a 18650 type (or kind) of cylindrical battery (diameter: 18 mm, height: 65 mm) or a 21700 type (or kind) of cylindrical battery (diameter: 21 mm, height: 70 mm), but is not limited thereto.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, and/or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethyl acetate, methyl propionate, ethyl propionate, decanolide, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like. The ketone-based solvent includes cyclohexanone and/or the like. The alcohol-based solvent includes ethyl alcohol, isopropyl alcohol, and/or the like, and examples of the aprotic solvent include nitriles such as R—CN (where R is a C2 to C20 linear, branched, or cyclic hydrocarbon, or may include a double bond, an aromatic ring, and/or an ether bond), amides such as dimethylformamide, dioxolanes such as 1,3-dioxolane, sulfolanes, and/or the like.

The organic solvent may be used alone or in a mixture. When the organic solvent is used in a mixture, the mixture ratio may be controlled in accordance with a suitable or desirable battery performance.

The carbonate-based solvent may include a mixture with a cyclic carbonate and a linear carbonate. The cyclic carbonate and linear carbonate are mixed together in a volume ratio of about 1:1 to about 1:9. When the mixture is used as an electrolyte, it may have enhanced performance.

The organic solvent may further include an aromatic hydrocarbon-based solvent as well as the carbonate-based solvent. The carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 1.

Chemical Formula 1

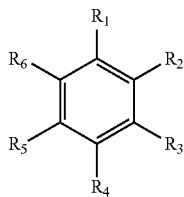

In Chemical Formula 1, $R_1$ to $R_6$ are the same or different and are selected from hydrogen, a halogen, a C1 to C10 alkyl group, a haloalkyl group, and a combination thereof.

Examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate, an ethylene carbonate-based compound represented by Chemical Formula 2, and/or propane sultone, as an additive for improving cycle life.

Chemical Formula 2

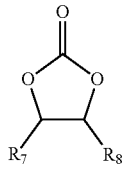

In Chemical Formula 2, $R_7$ and $R_8$ are the same or different and may each independently be hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen (e.g., are not both hydrogen).

Examples of the ethylene carbonate-based compound may include difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. In a case of further using the additive for improving cycle life, an amount of the additive may be suitably controlled within an appropriate or suitable range.

The non-aqueous organic solvent may further also include vinylethylene carbonate, hexanetricyanide, lithium tetrafluoroborate, propane sultone, and/or the like, as an additive.

The lithium salt dissolved in an organic solvent supplies a battery with lithium ions, basically operates the rechargeable lithium battery, and improves transportation of the lithium ions between positive and negative electrodes. Examples of the lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiPO_2F_2$, $LiN(C_xF_{2x+1}SO_2, C_yF_{2y+1}SO_2)$, where x and y are natural numbers, for example integers of 1 to 20), lithium difluoro (bisoxolato)phosphate, LiCl, LiI, $LiB(C_2O_4)_2$(lithium bis (oxalato) borate:LiBOB) or lithium difluoro(oxalato)borate (LiDFOB). A concentration of the lithium salt may be in a range from about 0.1 M to about 2.0 M. When the lithium salt is included at the above concentration range, an electrolyte may have excellent performance and lithium ion mobility due to suitable or optimal electrolyte conductivity and viscosity.

The rechargeable lithium battery may further include a separator between the negative electrode and the positive electrode, depending on a kind of the battery. Examples of a suitable separator material may include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 5:
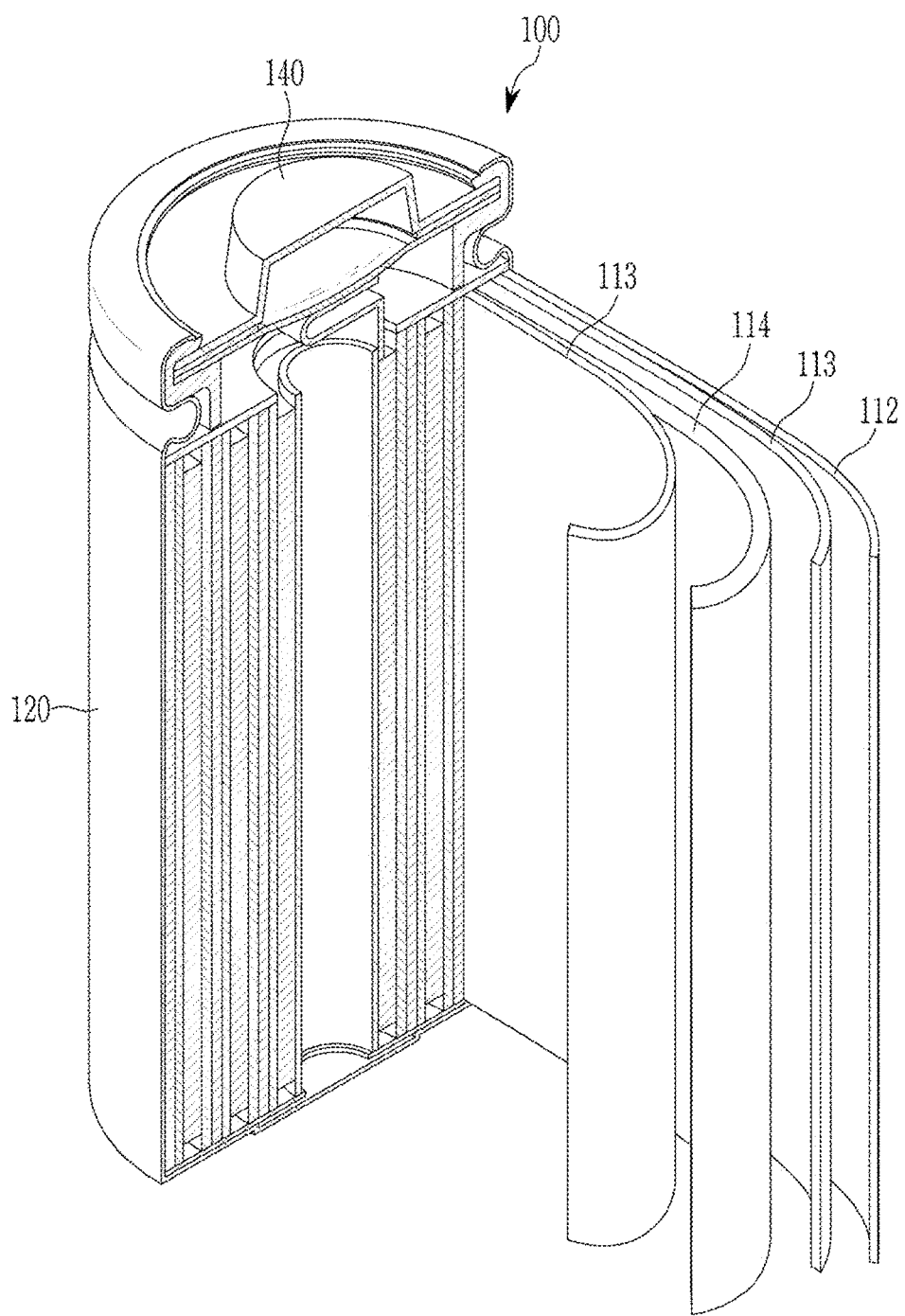
FIG. 5 is a schematic view showing the structure of a rechargeable lithium battery according to an embodiment.

FIG. 5 is an exploded perspective view of a rechargeable lithium battery according to an embodiment. A rechargeable lithium battery according to an embodiment may be a cylindrical battery.

Referring to FIG. 3, a rechargeable lithium battery 100 according to an embodiment is a cylindrical battery and includes a negative electrode 112, a positive electrode 114, and a separator 113, an electrolyte immersed into the negative electrode 112, the positive electrode 114, and the separator 113, a battery case 120, and a sealing member 140 housing the battery case 120.

The rechargeable lithium battery 100 includes an electrode assembly manufactured by sequentially stacking the negative electrode 112, the separator 113, and the positive electrode, winding it in a spiral form and housing it in the battery case 120.

Hereinafter, examples of the present disclosure and comparative examples are described. These examples, however, are not in any sense to be interpreted as limiting the scope of the present disclosure.

Example 1

97.5 wt % of artificial graphite, 1.5 wt % of styrene butadiene rubber, and 1.0 wt % of carboxymethyl cellulose were mixed with a water solvent to prepare a negative active material slurry for a first layer, having a viscosity (at 25° C.) of 2700 cps.

97.5 wt % of artificial graphite, 1.5 wt % of styrene butadiene rubber, and 1.0 wt % of carboxymethyl cellulose were mixed with a water solvent to prepare a negative active material slurry for a second layer, having a viscosity (at 25° C.) of 2300 cps.

A Cu foil was located under a magnet having a magnetic field strength of 4000 Gauss, and the negative active material slurry for the first layer was coated on the Cu foil, while the Cu foil was moved to expose it to the magnetic field for 3 seconds to 6 seconds, and dried to form a first layer having a one-side thickness of 100 μm. The Cu foil was located under the magnet in order to present the other side of the Cu foil corresponding to the side on which the first layer was formed, and the negative active material slurry for the first layer was coated on the Cu foil, while the Cu foil was moved to expose it to the magnetic field for 3 seconds, and dried to form a first layer having a one-side thickness of 100 μm. For example, the first layers were respectively formed on both sides of the Cu foil which corresponded to each other, and resultantly, the total thickness of the first layer on both sides was 200 μm.

Thereafter, similar to the first layer preparation process, the process including, by forming the negative active material slurry for the second layer on the first layer, exposing it to the magnetic field for 3 seconds to 6 seconds, and drying, was twice performed, to form a second layer having a total thickness of 70 μm.

After the first layer and the second layer were formed, compression and vacuum-drying (performed at 0.04 atm and 140° C.) were performed to a negative precursor having a one surface loading level (L/L) of 15 mg/cm². In the prepared negative electrode precursor, each total thickness of the first layer and the second layer formed on both sides was 140 μm and 45 μm, respectively, after compressing. That is, the total thickness of the first layer formed on both sides was about 76% of the total thickness of the negative active material layer.

A composition for an organic layer including polyamide imide as a high heat resistant engineering resin and a dimethyl acetate solvent was electrospun on the negative active material to form an organic layer. In the composition for an organic layer, an amount of polyamide imide was 10 wt % based on the total of 100 wt % of the composition for the organic layer.

The electrospinning was performed by the following method.

A collector roller and one nozzle pack including 52 tips in which a hole size was 25 G were positioned at a gap of 15 cm, the composition for the organic layer was added to the tip, a voltage of 40 kV to 50 kV was applied, and electrospinning was performed under a condition of 26° C. and a relative humidity of 50%. Herein, the speed of a roll of the collector roll was set to be 1 m/min to 3 m/min, and the solid amount in the composition for the organic layer emitted from tip was set to be 150 μl/min. Furthermore, the process was performed while compressed air was flowed under a 0.1 MPa pressure.

After completing the electrospinning, drying was performed using hot air at a temperature of 90° C.

According to the electrospinning, an organic layer having a thickness of 8 μm was formed. Thereafter, electrospraying was performed using a composition for an inorganic layer including alumina, a polyvinylidene fluoride binder, and a mixed solvent of dimethyl acetate and acetone (1:1 volume ratio) to prepare an inorganic layer. In the composition for an inorganic layer, an amount of polyamide imide was 90 wt % based on the total of 100 wt % of the composition for the inorganic layer.

The electrospraying was performed according to the following method.

A collector roller and one nozzle pack including 52 tips in which a hole size was 25 G were positioned at a gap of 15 cm, the composition for the inorganic layer was added to the tip, a voltage of 40 kV to 50 kV was applied, and electrospinning was performed under a condition of 26° C. and a relative humidity of 50%. Herein, the speed of a roll of the collector roll was set to be 1 m/min to 3 m/min, and the solid amount in the composition for the inorganic layer emitted from the tip was set to be 10 μl/min. Furthermore, the process was performed while compressed air was flowed under a 0.1 MPa pressure.

After completing the electrospinning, drying was performed using hot air at a temperature of 90° C.

According to the electrospraying, an inorganic layer having a thickness of 12 μm was formed.

According to the process, a negative electrode in which the organic-inorganic composite layer of the organic layer and the inorganic layer was integrated with the negative active material layer was prepared.

96 wt % of $LiCoO_2$, 2 wt % of ketjen black, and 2 wt % of polyvinylidene fluoride were mixed in an N-methyl pyrrolidone solvent to prepare a positive active material slurry. The positive active material slurry was coated on an Al current collector, dried, and compressed to prepare a positive electrode.

The negative electrode and the positive electrode were stacked in contact with each other to fabricate an electrode assembly. Herein, the organic-inorganic composite layer of the negative electrode was positioned to be contacted with the positive electrode. A rechargeable lithium cell was fabricated by using the electrode assembly and electrolyte. The electrolyte was prepared by using a mixed solvent of ethylene carbonate and ethylmethyl carbonate (a volume ratio of 50:50) and dissolving 1 M $LiPF_6$ therein.

Example 2

97.5 wt % of artificial graphite, 1.5 wt % of a styrene butadiene rubber, and 1.0 wt % of carboxymethyl cellulose were mixed with a water solvent to prepare a negative active material slurry for a first layer, having a viscosity (at 25° C.) of 3500 cps.

A negative active material layer was prepared by substantially the same procedure as in Example 1, except that the negative active material slurry for the first layer and the negative active material slurry for the second layer prepared in Example 1, having a viscosity of 2300 cps (at 25° C.), were used.

Before compressing and vacuum-drying, a negative electrode having a thickness of 200 μm of the first layer on both sides, a thickness of 70 μm of the second layer on both sides, and a one side loading level (L/L) of 15 mg/cm² was prepared. In the negative electrode, each total thickness of the first layer and the second layer formed on both sides was 140 μm and 45 μm, respectively, after compressing and vacuum-drying. That is, the total thickness of the first layer formed on both sides was about 76% of the total thickness of the negative active material layer.

An organic layer and an inorganic layer were formed on the negative active material layer by the same procedure as in Example 1 to fabricate a negative electrode in which an organic-inorganic composite layer was integrated with the negative active material layer.

Using the negative electrode, and the positive electrode and an electrolyte of Example 1, a rechargeable lithium battery was fabricated by the same procedure as in Example 1.

Example 3

A negative active material layer was prepared according to substantially the same method as Example 2 except for using a magnet having a magnetic field strength of 6000 Gauss and an organic layer and inorganic layer were formed by the same procedure as in Example 1 to fabricate an electrode in which the organic-inorganic composite layer is integrated with the negative active material layer.

Before compressing and vacuum-drying, a negative electrode having a thickness of 200 μm of the first layer on both sides, a thickness of 70 μm of the second layer on both sides, and a one-side loading level (L/L) of 15 mg/cm$^2$ was prepared. In the negative electrode, each total thickness of the first layer and the second layer formed on both sides was 140 μm and 45 μm, respectively, after compressing and vacuum-drying. That is, the total thickness of the first layer formed on both sides was about 76% of the total thickness of the negative active material layer.

Using the negative electrode, and the positive electrode and an electrolyte of Example 1, a rechargeable lithium battery was fabricated by the same procedure as in Example 1.

Example 4

97.5 wt % of artificial graphite, 1.5 wt % of a styrene butadiene rubber, and 1.0 wt % of carboxymethyl cellulose were mixed with a water solvent to prepare a negative active material slurry for a first layer, having a viscosity (at 25° C.) of 3100 cps.

97.5 wt % of artificial graphite, 1.5 wt % of a styrene butadiene rubber, and 1.0 wt % of carboxymethyl cellulose were mixed with a water solvent to prepare a negative active material slurry for a second layer, having a viscosity (at 25° C.) of 2500 cps.

A negative active material layer was prepared by substantially the same procedure as in Example 1, except that the negative active material slurry for the first layer and the negative active material slurry for the second layer were used.

Before compressing and vacuum-drying, a negative electrode having a thickness of 200 μm of the first layer on both sides, a thickness of 70 μm of the second layer on both sides, and a one-side loading level (L/L) of 15 mg/cm$^2$ was prepared. In the negative electrode, each total thickness of the first layer and the second layer formed on both sides was 140 μm and 45 μm, respectively, after compressing and vacuum-drying. That is, the total thickness of the first layer formed on both sides was about 76% of the total thickness of the negative active material layer.

An organic layer and an inorganic layer were formed on the negative active material layer by the same procedure as in Example 1 to fabricate a negative electrode in which an organic-inorganic composite layer was integrated with the negative active material layer.

Using the negative electrode, and the positive electrode and the electrolyte of Example 1, a rechargeable lithium battery was fabricated by the same procedure as in Example 1.

Example 5

97.5 wt % of artificial graphite, 1.5 wt % of a styrene butadiene rubber, and 1.0 wt % of carboxymethyl cellulose were mixed with a water solvent to prepare a negative active material slurry for a first layer, having a viscosity (at 25° C.) of 2900 cps.

97.5 wt % of artificial graphite, 1.5 wt % of a styrene butadiene rubber, and 1.0 wt % of carboxymethyl cellulose were mixed with a water solvent to prepare a negative active material slurry for a second layer, having a viscosity (at 25° C.) of 2400 cps.

A negative active material layer was prepared by substantially the same procedure as in Example 1, except that the negative active material slurry for the first layer and the negative active material slurry for the second layer were used.

Before compressing and vacuum-drying, a negative electrode having a thickness of 200 μm of the first layer on both sides, a thickness of 70 μm of the second layer on both sides, and a one-side loading level (L/L) of 15 mg/cm$^2$ was prepared. In the negative electrode, each total thickness of the first layer and the second layer formed on both sides was 140 μm and 45 μm, respectively, after compressing and vacuum-drying. That is, the total thickness of the first layer formed on both sides was about 76% of the total thickness of the negative active material layer.

An organic layer and an inorganic layer were formed on the negative active material layer by the same procedure as in Example 1 to fabricate a negative electrode in which an organic-inorganic composite layer was integrated with the negative active material layer.

Using the negative electrode, and the positive electrode and the electrolyte of Example 1, a rechargeable lithium battery was fabricated by the same procedure as in Example 1.

Example 6

97.5 wt % of artificial graphite, 1.5 wt % of a styrene butadiene rubber, and 1.0 wt % of carboxymethyl cellulose were mixed with a water solvent to prepare a negative active material slurry for a first layer, having a viscosity (at 25° C.) of 2600 cps.

97.5 wt % of artificial graphite, 1.5 wt % of a styrene butadiene rubber, and 1.0 wt % of carboxymethyl cellulose were mixed with a water solvent to prepare a negative active material slurry for a second layer, having a viscosity (at 25° C.) of 2400 cps.

A negative active material layer was prepared by substantially the same procedure as in Example 1, except that the negative active material slurry for the first layer and the negative active material slurry for the second layer were used.

Before compressing and vacuum-drying, a negative electrode having a thickness of 200 μm of the first layer on both sides, a thickness of 70 μm of the second layer on both sides, and a one-side loading level (L/L) of 15 mg/cm$^2$ was prepared. In the negative electrode, each total thickness of the first layer and the second layer formed on both sides was 140 μm and 45 μm, respectively, after compressing and vacuum-drying. That is, the total thickness of the first layer formed on both sides was about 76% of the total thickness of the negative active material layer.

An organic layer and an inorganic layer were formed on the negative active material layer by the same procedure as in Example 1 to fabricate a negative electrode in which an organic-inorganic composite layer was integrated with the negative active material layer.

Using the negative electrode, and the positive electrode and the electrolyte of Example 1, a rechargeable lithium battery was fabricated by the same procedure as in Example 1.

Example 7

97.5 wt % of artificial graphite, 1.5 wt % of a styrene butadiene rubber, and 1.0 wt % of carboxymethyl cellulose were mixed with a water solvent to prepare a negative active material slurry for a first layer, having a viscosity (at 25° C.) of 3400 cps.

97.5 wt % of artificial graphite, 1.5 wt % of a styrene butadiene rubber, and 1.0 wt % of carboxymethyl cellulose were mixed with a water solvent to prepare a negative active material slurry for a second layer, with a viscosity (at 25° C.) of 2000 cps.

A negative active material layer was prepared by substantially the same procedure as in Example 1, except that the negative active material slurry for the first layer and the negative active material slurry for the second layer were used.

Before compressing and vacuum-drying, a negative electrode having a thickness of 200 μm of the first layer on both sides, a thickness of 70 μm of the second layer on both sides, and a one-side loading level (L/L) of 15 mg/cm² was prepared. In the negative electrode, each total thickness of the first layer and the second layer formed on both sides was 140 μm and 45 μm, respectively, after compressing and vacuum-drying. That is, the total thickness of the first layer formed on both sides was about 76% of the total thickness of the negative active material layer.

An organic layer and an inorganic layer were formed on the negative active material layer by the same procedure as in Example 1 to fabricate a negative electrode in which an organic-inorganic composite layer was integrated with the negative active material layer.

Using the negative electrode, and the positive electrode and the electrolyte of Example 1, a rechargeable lithium battery was fabricated by the same procedure as in Example 1.

Example 8

97.5 wt % of artificial graphite, 1.5 wt % of a styrene butadiene rubber, and 1.0 wt % of carboxymethyl cellulose were mixed with a water solvent to prepare a negative active material slurry for a first layer, having a viscosity (at 25° C.) of 3450 cps.

97.5 wt % of artificial graphite, 1.5 wt % of a styrene butadiene rubber, and 1.0 wt % of carboxymethyl cellulose were mixed with a water solvent to prepare a negative active material slurry for a second layer, having a viscosity (at 25° C.) of 2400 cps.

A negative active material layer was prepared by substantially the same procedure as in Example 1, except that the negative active material slurry for the first layer and the negative active material slurry for the second layer were used.

Comparative Example 1

97.5 wt % of artificial graphite, 1.5 wt % of a styrene butadiene rubber, and 1.0 wt % of carboxymethyl cellulose were mixed with a water solvent to prepare a negative active material slurry for a first layer, having a viscosity (at 25° C.) of 2500 cps.

97.5 wt % of artificial graphite, 1.5 wt % of a styrene butadiene rubber, and 1.0 wt % of carboxymethyl cellulose were mixed with a water solvent to prepare a negative active material slurry for a second layer, having a viscosity (at 25° C.) of 2300 cps.

The negative active material slurry for the first layer was coated on one side of Cu foil and dried to prepare a first layer having a one-side thickness of 100 μm and the negative active material slurry for the second layer was coated on the first layer and dried to prepare a second layer having a one-side thickness of 35 μm. Thereafter, the Cu foil was turned over and a first layer and a second layer were respectively formed on the other side of the Cu foil to have the same thickness in the same procedure, thereby preparing a negative active material layer.

Before compressing and vacuum-drying, a negative electrode having a thickness of 200 μm of the first layer on both sides, a thickness of 70 μm of the second layer on both sides, and a one-side loading level (L/L) of 15 mg/cm² was prepared. In the negative electrode, each total thickness of the first layer and the second layer formed on both sides was 140 μm and 45 μm, respectively, after compressing and vacuum-drying. That is, the total thickness of the first layer formed on both sides was about 76% of the total thickness of the negative active material layer.

An organic layer and an inorganic layer were formed on the negative active material layer by the same procedure as in Example 1 to fabricate a negative electrode in which an organic-inorganic composite layer was integrated with the negative active material layer.

Using the negative electrode, and the positive electrode and the electrolyte of Example 1, a rechargeable lithium battery was fabricated by the same procedure as in Example 1.

Comparative Example 2

97.5 wt % of artificial graphite, 1.5 wt % of a styrene butadiene rubber, and 1.0 wt % of carboxymethyl cellulose were mixed with a water solvent to prepare a negative active material slurry for a first layer, having a viscosity (at 25° C.) of 2500 cps.

97.5 wt % of artificial graphite, 1.5 wt % of a styrene butadiene rubber, and 1.0 wt % of carboxymethyl cellulose were mixed with a water solvent to prepare a negative active material slurry for a second layer, having a viscosity (at 25° C.) of 1900 cps.

A negative active material layer was prepared by substantially the same procedure as in Comparative Example 1, except that the negative active material slurry for the first layer and the negative active material slurry for the second layer were used.

Before compressing and vacuum-drying, a negative electrode having a thickness of 200 μm of the first layer on both sides, a thickness of 70 μm of the second layer on both sides, and a one-side loading level (L/L) of 15 mg/cm² was prepared. In the negative active material layer, each total thickness of the first layer and the second layer formed on both sides was 140 μm and 45 μm, respectively, after compressing and vacuum-drying. That is, the total thickness of the first layer formed on both sides was about 76% of the total thickness of the negative active material layer.

An organic layer and an inorganic layer were formed on the negative active material layer by the same procedure as in Example 1 to fabricate a negative electrode in which an organic-inorganic composite layer was integrated with the negative active material layer.

Using the negative electrode, and the positive electrode and the electrolyte of Example 1, a rechargeable lithium battery was fabricated by the same procedure as in Example 1.

Comparative Example 3

97.5 wt % of artificial graphite, 1.5 wt % of a styrene butadiene rubber, and 1.0 wt % of carboxymethyl cellulose were mixed with a water solvent to prepare a negative active material slurry for a first layer, having a viscosity (at 25° C.) of 3600 cps.

97.5 wt % of artificial graphite, 1.5 wt % of a styrene butadiene rubber, and 1.0 wt % of carboxymethyl cellulose were mixed with a water solvent to prepare a negative active material slurry for a second layer, having a viscosity (at 25° C.) of 2000 cps.

A negative active material layer was prepared by substantially the same procedure as in Comparative Example 1, except that the negative active material slurry for the first layer and the negative active material slurry for the second layer were used.

Before compressing and vacuum-drying, a negative electrode having a thickness of 200 μm of the first layer on both sides, a thickness of 70 μm of the second layer on both sides, and a one-side loading level (L/L) of 15 mg/cm$^2$ was prepared. In the negative active material layer, each total thickness of the first layer and the second layer formed on both sides was 140 μm and 45 μm, respectively, after compressing and vacuum-drying. That is, the total thickness of the first layer formed on both sides was about 76% of the total thickness of the negative active material layer.

An organic layer and an inorganic layer were formed on the negative active material layer by the same procedure as in Example 1 to fabricate a negative electrode in which an organic-inorganic composite layer was integrated with the negative active material layer.

Using the negative electrode and the positive electrode of Example 1, a rechargeable lithium battery was fabricated by the same procedure as in Example 1.

Comparative Example 4

97.5 wt % of artificial graphite, 1.5 wt % of a styrene butadiene rubber, and 1.0 wt % of carboxymethyl cellulose were mixed with a water solvent to prepare a negative active material slurry for a first layer, having a viscosity (at 25° C.) of 2700 cps.

97.5 wt % of artificial graphite, 1.5 wt % of a styrene butadiene rubber, and 1.0 wt % of carboxymethyl cellulose were mixed with a water solvent to prepare a negative active material slurry for a second layer, having a viscosity (at 25° C.) of 2300 cps.

A negative active material layer was prepared by substantially the same procedure as in Example 1, except that the negative active material slurry for the first layer and the negative active material slurry for the second layer were used.

Before compressing and vacuum-drying, a negative electrode having a thickness of 200 μm of the first layer on both sides, a thickness of 70 μm of the second layer on both sides, and a one-side loading level (L/L) of 15 mg/cm$^2$ was prepared. In the negative active material layer, each total thickness of the first layer and the second layer formed on both sides was 140 μm and 45 μm, respectively, after compressing and vacuum-drying. That is, the total thickness of the first layer formed on both sides was about 76% of the total thickness of the negative active material layer.

An organic layer and an inorganic layer were formed on the negative active material layer by the same procedure as in Example 1 to fabricate a negative electrode in which an organic-inorganic composite layer was integrated with the negative active material layer.

The negative electrode, a polyethylene separator (thickness: 16 μm) and the positive electrode of Example 1 were stacked and compressed at 90° C. and a load of 270 kg for 10 seconds to fabricate an electrode assembly. Using the electrolyte assembly and the electrolyte of Example 1, a rechargeable lithium cell was fabricated.

Comparative Example 5

97.5 wt % of artificial graphite, 1.5 wt % of a styrene butadiene rubber, and 1.0 wt % of carboxymethyl cellulose were mixed with a water solvent to prepare a negative active material slurry for a first layer, having a viscosity (at 25° C.) of 4200 cps.

97.5 wt % of artificial graphite, 1.5 wt % of a styrene butadiene rubber, and 1.0 wt % of carboxymethyl cellulose were mixed with a water solvent to prepare a negative active material slurry for a second layer, having a viscosity (at 25° C.) of 2300 cps.

A negative active material layer was prepared by substantially the same procedure as in Comparative Example 4, except that the negative active material slurry for the first layer and the negative active material slurry for the second layer were used.

The composition for organic layer used in Example 1 was electrospun on the negative active material layer by the same procedure as in Example 1 to form an organic layer with a thickness of 12 μm, thereby obtaining a negative electrode in which the negative active material layer was integrated with the organic layer.

Using the negative electrode, and the positive electrode and the electrolyte of Example 1, a rechargeable lithium battery was fabricated by the same procedure as in Example 1.

Comparative Example 6

A negative active material layer was prepared by the same procedure as in Comparative Example 5, and the composition for inorganic layer was electrosprayed on the negative active material layer by the same procedure as in Example 1 to form an inorganic layer with a thickness of 12 μm, thereby obtaining the negative electrode in which the negative active material layer was integrated with the inorganic layer.

Using the negative electrode, and the positive electrode and the electrolyte of Example 1, a rechargeable lithium battery was fabricated by the same procedure as in Example 1.

Comparative Example 7

A negative active material layer was prepared by the same procedure as in Comparative Example 5, and the composition for an organic layer prepared in Example 1 was electrosprayed on the negative active material layer by the same procedure as in Example 1 to form an organic layer having a thickness of 8 μm. Thereafter, a composition for a second organic layer including polyacrylonitrile, polyvinylidene fluoride, and a dimethylacetate solvent was electrosprayed on the first organic layer by the same procedure as in Example 1 to form a second organic layer having a thickness of 8 μm.

In the composition for the second organic layer, an amount of polyacrylonitrile was 6 wt % based on the total weight of the second organic layer composition and the amount of the polyvinylidene fluoride binder was 6 wt % based on the total weight of the second organic layer composition.

According to the above procedures, a negative electrode in which the first organic layer and the second organic layer were integrated with the negative active material layer was prepared.

Using the negative electrode, and the positive electrode and the electrolyte of Example 1, a rechargeable lithium battery was fabricated by the same procedure as in Example 1.

The configurations together with the viscosity and the magnetic field strength of the first negative active slurry and the second negative active material slurry according to Examples 1 to 8 and Comparative Examples 1 to 7 are shown in Table 1.

Experimental Example 1) Measurement of X-ray diffraction characteristic

The rechargeable lithium cells according to Example 1 to 8 and Comparative Examples 1 to 7 were charged and discharged at 0.1 C twice, and fully discharged at 0.1 C to 2.75 V. The DD value of the first layer was obtained by measuring XRD to the adjacently attached portion to the current collector which was obtained by separating the negative active material layer from the current collector using tape, after charging and discharging.

The fully-discharged battery cells were disassembled to obtain negative electrodes. As for these negative electrodes, X'Pert (PANalytical B.V.) XRD equipment using a CuKα ray as a target ray was used, but monochromator equipment was removed in order to improve a peak intensity resolution. Herein, the measurement was performed under a condition of 2θ=10° to 80°, a scan speed (°/S)=0.06436, and a step size of 0.026°/step.

From the measured XRD results, the DD values of the total negative active material layer and the first layer were calculated. The results are shown in Table 1.

The areas of the peaks shown at 2θ=26.5±0.2° ((002) plane), 42.4±0.2° ((100) plane), 43.4±0.2° ((101) R plane), 44.6±0.2° ((101) H plane), 54.7±0.2° ((004) plane), and 77.5±0.2° ((110) plane) were measure, and the area sum of peaks shown at 2θ=42.4±0.2° ((100) plane), 43.4±0.2° ((101)R plane), 44.6±0.2° ((101)H plane), and 77.5±0.2° ((110) plane) as $I_a$, and the area sum of peaks shown at 2θ=26.50.2° ((002) plane), 42.40.2° ((100) plane), 43.40.2° ((101)R plane), 44.60.2° ((101)H plane), 54.70.2° ((004) plane), and 77.50.2° ((110) plane) as $I_{total}$, and DD (Itotal/Ia) was obtained by calculating from the obtained values. The results are shown in Table 1. As the negative active material layer was a single layer in Comparative Example 1, the DD value of the negative active material layer was indicated as the DD value of the first layer, and the total DD value and the DD value of the first layer were the same.

Furthermore, the $I_{(004)}/I_{(002)}$ and $I_{(110)}/I_{(004)}$ were calculated. The results are shown in Table 2. In particular, a peak at 43.4±0.2° appeared by overlapping a peak of a (101)R plane of graphite with another peak of a (111) plane of a Cu current collector.

TABLE 1

| | DD first layer | DD of negative active material layer | DD of first layer/DD negative of active material layer (%) | Viscosity of first layer composition (cps) | Viscosity of second layer composition (cps) | Magnetic field strength (Gauss) | Presence of organic-inorganic composite layer | Presence of separator |
|---|---|---|---|---|---|---|---|---|
| Example 1 | 43 | 57 | 75.4 | 2700 | 2300 | 4000 | ◯ | X |
| Example 2 | 18 | 57 | 31.6 | 3500 | 2300 | 4000 | ◯ | X |
| Example 3 | 23.2 | 60 | 38.7 | 3500 | 2300 | 6000 | ◯ | X |
| Example 4 | 33 | 55 | 60.0 | 3100 | 2500 | 4000 | ◯ | X |
| Example 5 | 39.9 | 56 | 71.3 | 2900 | 2400 | 4000 | ◯ | X |
| Example 6 | 45.6 | 56 | 81.4 | 2600 | 2400 | 4000 | ◯ | X |
| Example 7 | 24 | 60 | 40.0 | 3400 | 2000 | 4000 | ◯ | X |
| Example 8 | 22 | 55 | 40.0 | 3450 | 2400 | 4000 | ◯ | X |
| Comparative Example 1 | 17 | 17 | 100.0 | 2500 | 2300 | — | ◯ | X |
| Comparative Example 2 | 18 | 16 | 112.5 | 2500 | 1900 | — | ◯ | X |
| Comparative Example 3 | 17 | 18 | 94.4 | 3600 | 2000 | — | ◯ | X |
| Comparative Example 4 | 48 | 57 | 84.2 | 2700 | 2300 | 4000 | ◯ | ◯ |
| Comparative Example 5 | 18 | 57 | 31.6 | 4200 | 2300 | 4000 | Only organic layer | X |
| Comparative Example 6 | 18 | 57 | 31.6 | 4200 | 2300 | 4000 | Only inorganic layer | X |
| Comparative Example 7 | 18 | 57 | 31.6 | 4200 | 2300 | 4000 | 2 layers of only organic layers | X |

Experimental Example 2) Evaluation of Cycle-Life Characteristic

The full cells of Examples 1 to 8 and Comparative Examples 1 to 7 were respectively constant current/constant voltage charged under a condition of 1.0 C, 4.4 V, and a 0.1

C cut-off at room temperature (25° C.), paused for 5 minutes, constant current discharged under a condition of 1.0 C and a 3.0 V cut-off and paused for 5 minutes as a one cycle, and this cycle was repeated 400 times. A capacity retention depending on a charge and discharge cycle was evaluated by calculating a discharge capacity ratio at each cycle relative to discharge capacity at the first cycle.

The results are shown in Table 2.

Experimental Example 3: High-Rate Characteristic Evaluation

The rechargeable lithium cells according to Examples 1 to 8 and Comparative Examples 1 to 7 were constant-current charged at 0.2 C and 4.4 V and constant-voltage charged until the current reached to 0.025 C, while 4.4 V was maintained. The cells constant-voltage charged were constant-current discharged at 0.2 C, 0.5 C, 1.0 C, and 2.0 C until the voltage reached 2.75 V, and the ratio of discharge capacity at 2.0 C to discharge capacity at 0.2 C discharge was calculated. The results are shown in Table 2, as rate capability.

TABLE 2

|  | Cycle characteristic (%) | Rate-capability (%) (2 C/0.2 C) |
|---|---|---|
| Example 1 | 84 | 75.6 |
| Example 2 | 79 | 70.5 |
| Example 3 | 78.8 | 72.1 |
| Example 4 | 81.5 | 72.6 |
| Example 5 | 85.8 | 74.8 |
| Example 6 | 86.2 | 74.5 |
| Example 7 | 80.8 | 71.1 |
| Example 8 | 80.1 | 71.8 |
| Comparative Example 1 | 65.1 | 61.1 |
| Comparative Example 2 | 64.8 | 60.8 |
| Comparative Example 3 | 62.9 | 62.8 |
| Comparative Example 4 | 62.9 | 61.6 |
| Comparative Example 5 | Occurrence of precipitation | Occurrence of precipitation |
| Comparative Example 6 | 73.2 | 71 |
| Comparative Example 7 | Occurrence of precipitation | Occurrence of precipitation |

As shown in Table 2, Examples 1 to 8 in which the negative active material layer included the first layer and the second layer, the DD value of the first layer corresponded to about 30% to about 90% of the DD value of the negative active material layer, and the negative active material layer was integrated with the organic-inorganic composite layer, exhibited excellent cycle-life characteristic and high-rate capability.

Whereas, Comparative Examples 1 to 3 in which the DD value of the first layer was 94.4% to 112.5% of the DD value of the negative active material with no magnetic field application for preparing the negative active material layer, even though the negative active material layer was integrated with the organic-inorganic composite layer, exhibited severely deteriorated cycle-life characteristic and high rate capability.

Comparative Example 4 additionally including the separator, even though the negative active material layer includes the first layer and the second layer, the DD value of the first layer corresponded to about 30% to about 90% of the DD value of the negative active material layer and the negative active material layer is integrated with the organic-inorganic composite layer, exhibited deteriorated cycle-life characteristics and high-rate capability. From the result, the additional separator may cause deterioration of battery performance.

Comparative Example 6 included an inorganic layer. Even though the negative active material layer of Comparative Example 6 satisfied the condition of the DD value of the present disclosure, Comparative Example 6 exhibited deteriorated cycle-life characteristic and high rate capability.

Furthermore, Comparative Example 7 including two organic layers and Comparative Example 5 only including the organic layer, even though the negative active material layer satisfied the condition of the DD value of the present disclosure, caused short-circuit due to generated lithium dendrites, for example, occurred precipitation, and thus, it cannot work as a battery and the results cannot be obtained.

Experimental Example 4) Measurement of DD values according to viscosity of active material slurry Comparative Example 8

97.5 wt % of artificial graphite, 1.5 wt % of styrene butadiene rubber, and 1.0 wt % of carboxymethyl cellulose were mixed with a water solvent to prepare a negative active material slurry for a first layer, having a viscosity (at 25° C.) of 2300 cps.

97.5 wt % of artificial graphite, 1.5 wt % of styrene butadiene rubber, and 1.0 wt % of carboxymethyl cellulose were mixed with a water solvent to prepare a negative active material slurry for a second layer, having a viscosity (at 25° C.) of 2700 cps.

A Cu foil was located under a magnet having a magnetic field strength of 4000 Gauss, and a negative active material slurry for the first layer was coated on the Cu foil, while the Cu foil was moved to expose a magnetic field for 3 seconds, and dried to form a first layer having a cross-section thickness of 100 μm. The Cu foil was located under the magnet in order to present the other side of the Cu foil corresponding to the side on which the first layer was formed, and the negative active material slurry for the first layer was coated on the Cu foil, while the Cu foil was moved to expose it to the magnetic field for 3 seconds, and dried to form a first layer having a one-side thickness of 100 μm. That is, the first layers were respectively formed on both sides of the Cu foil which corresponded to each other, and resultantly, the total thickness of the first layer on both sides was 200 μm.

Thereafter, similar to the first layer preparation process, the process included forming the negative active material slurry for the second layer on the first layer, exposing it to the magnetic field for 3 seconds, and drying, twice, to form a second layer having a total thickness of 70 μm.

After the first layer and the second layer were formed, compression and vacuum-drying (performed at 0.04 atm and 140° C.) were performed to a negative precursor having a one-side loading level (L/L) of 15 mg/cm$^2$. In the prepared negative electrode, each total thickness of the first layer and the second layer formed on both sides was 140 μm and 45 μm, respectively, after compressing. That is, the total thickness of the first layer formed on both sides was about 76% of the total thickness of the negative active material layer.

Using the negative electrode, and the positive electrode and the electrolyte of Example 1, a rechargeable lithium battery was fabricated by the same procedure as in Example 1.

The X-ray diffraction for the rechargeable lithium cell was measured by the same procedure as in Experimental Example 1, and the DD values of the total negative active material layer and the first layer were measured from the obtained results. The results are respectively 24.07 and 34.62. From the results, the ratio of the DD value of the first layer/the DD value of the negative active material layer is resultantly about 143%. Accordingly, even if the magnetic field strength and the exposing time are the same, it can clearly be seen that the results depend on the viscosity of the slurry.

While the subject matter of this disclosure has been described in connection with what is presently considered to be practical example embodiments, it is to be understood that the present disclosure is not limited to the disclosed embodiments, but, on the contrary, is intended to cover various modifications and equivalent arrangements included within the spirit and scope of the appended claims.

What is claimed is:

1. An electrode assembly for a rechargeable lithium battery comprising:
    a negative electrode comprising a current collector, a negative active material layer, an organic-inorganic composite layer integrated with the negative active material layer, the negative active material layer comprising an organic layer and an inorganic layer; and
    a positive electrode,
    wherein the negative active material layer comprises a first layer that physically contacts the current collector, the first layer comprising a first carbon-based negative active material, and a second layer on the first layer, the second layer comprising a second carbon-based negative active material,
    wherein a Degree of Divergence (DD) value of the first layer is about 30% to about 90% of a DD value of the negative active material layer, and
    the DD values are defined by Equation 1:

$DD(\text{Degree of Divergence})=(I_a/I_{total})*100$    Equation 1 wherein, in Equation 1,
    $I_a$ is a sum of peak intensities at 2θ=42.4±0.2°, 43.4±0.2°, 44.6±0.2°, and 77.5±0.2° measured by XRD using a CuKα ray, and
    $I_{total}$ is a sum of peak intensities at 2θ=26.5±0.2°, 42.4±0.2°, 43.4±0.2°, 44.6±0.2°, 54.7±0.2°, and 77.5±0.2° measured by XRD using a CuKα ray.

2. The electrode assembly for the rechargeable lithium battery of claim 1, wherein the organic layer physically contacts the negative active material layer.

3. The electrode assembly for the rechargeable lithium battery of claim 1, wherein the inorganic layer physically contacts the negative active material layer.

4. The electrode assembly for the rechargeable lithium battery of claim 1, wherein the organic layer comprises a polyolefin-based polymer, polyester, polyamide, polyimide, polyamideimide, polyetherimide, polyacrylonitrile, polyvinylidene fluoride, polyvinyl chloride, polyvinylidene chloride, a polyethylene glycol derivative, polyoxide, polyvinyl acetate, polystyrene, polyvinylpyrrolidone, a copolymer thereof, or a combination thereof.

5. The electrode assembly for the rechargeable lithium battery of claim 1, wherein the inorganic layer comprises alumina, boehmite, zirconia, titanium oxide, silica, or a combination thereof.

6. The electrode assembly for the rechargeable lithium battery of claim 1, wherein the DD value of the first layer is about 70% to about 90% of the DD value of the negative active material layer.

7. The electrode assembly for the rechargeable lithium battery of claim 1, wherein the organic layer has a thickness of about 1 μm to about 20 μm.

8. The electrode assembly for the rechargeable lithium battery of claim 1, wherein the inorganic layer has a thickness of about 1 μm to about 25 μm.

9. The electrode assembly for the rechargeable lithium battery of claim 1, wherein the DD value of the negative active material layer is about 19 to about 60.

10. The electrode assembly for the rechargeable lithium battery of claim 1, wherein the DD value of the first layer is about 18 to about 54.

11. The electrode assembly for the rechargeable lithium battery of claim 1, wherein a peak intensity is a peak integral area value.

12. The electrode assembly for the rechargeable lithium battery of claim 1, wherein the first carbon-based negative active material and/or the second carbon-based negative active material is artificial graphite or a mixture of artificial graphite and natural graphite.

13. A rechargeable lithium battery, comprising
    an electrode assembly of claim 1; and
    an electrolyte.

14. The rechargeable lithium battery of claim 13, wherein: the rechargeable lithium battery has high power.

* * * * *

UNITED STATES PATENT AND TRADEMARK OFFICE
CERTIFICATE OF CORRECTION

| | |
|---|---|
| PATENT NO. | : 11,837,716 B2 |
| APPLICATION NO. | : 17/445990 |
| DATED | : December 5, 2023 |
| INVENTOR(S) | : Hyo-jung Song et al. |

It is certified that error appears in the above-identified patent and that said Letters Patent is hereby corrected as shown below:

In the Claims

In Column 33, Line 42, in Claim 1, delete "$26=26.5\pm0.2°$," and insert -- $2\theta=26.5\pm0.2°$, --.

Signed and Sealed this
Third Day of September, 2024

Katherine Kelly Vidal
*Director of the United States Patent and Trademark Office*